March 22, 1938. C. E. REED 2,111,732
CUTTER AND SPINDLE ASSEMBLY
Filed April 23, 1936

Inventor:
Clarence E. Reed,
By Spear, Middleton & Hall
Attorneys.

Patented Mar. 22, 1938

2,111,732

UNITED STATES PATENT OFFICE 2,111,732

CUTTER AND SPINDLE ASSEMBLY

Clarence E. Reed, Wichita, Kans., assignor to Chicago Pneumatic Tool Company, New York, N. Y., a corporation of New Jersey Application April 23, 1936, Serial No. 76,069

6 Claims. (Cl. 255—71)

The invention concerns a roller cutter, spindle and anti-friction bearing assembly for earth boring drills, and among its objects is to provide an assembly in which the load sustaining anti-friction bearings and the means for locking the cutter on its spindle will provide line contact engagement with the cutter and spindle throughout most of the lengths of said parts, the main radial loads being taken by long frusto-conical rollers and the locking function being performed by short frusto-conical rollers. A further object of the invention is to provide an assembly in which the cutter will have a thick cutter wall, and particularly at those portions which sustain the heavy loads at the base thereof.

Figure 1:
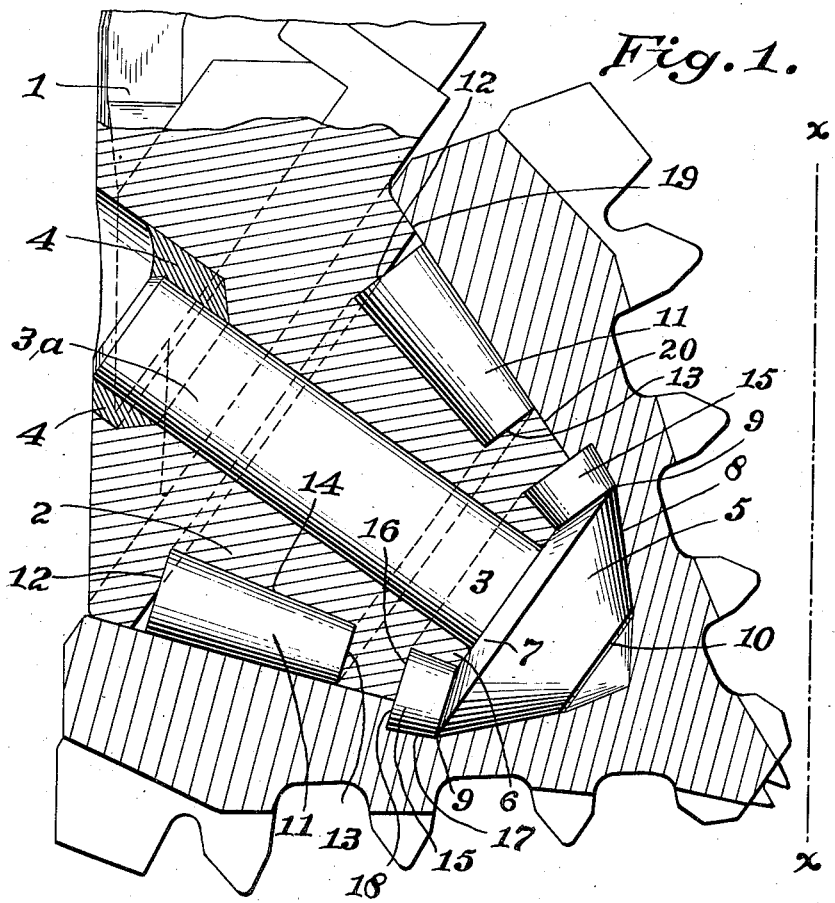
Figure 1 is a sectional view of the cutter and spindle, the frusto-conical rollers being shown in elevation.
Figure 2:
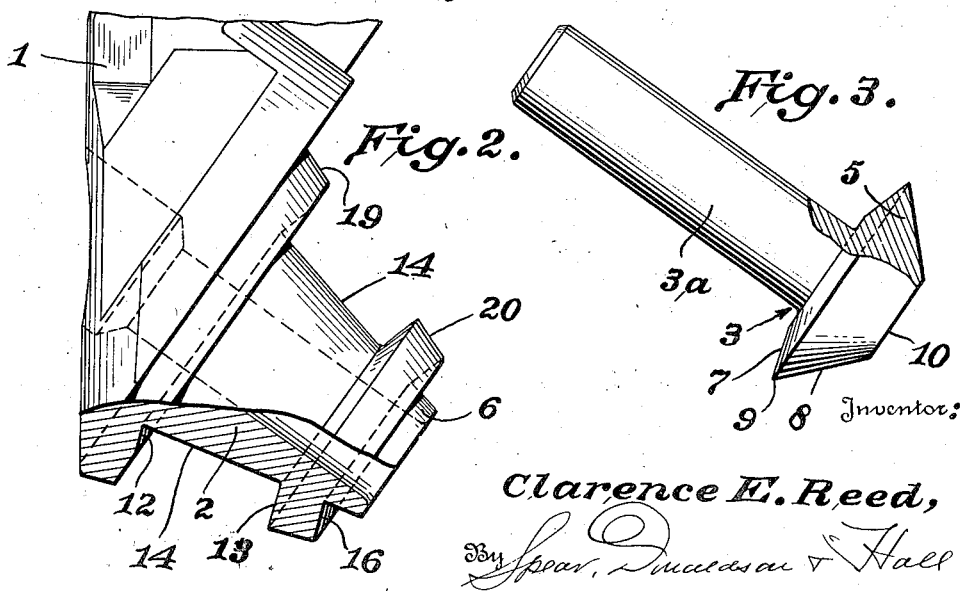
Fig. 2 is a view of the main part of the spindle with a portion of its support.
Figure 3:
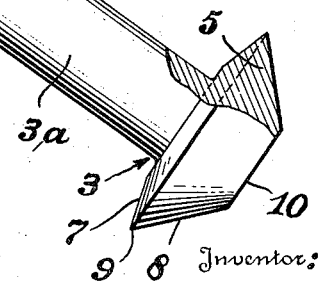
Fig. 3 is a side view of the terminal portion of the spindle, partly broken away.

In this drawing 1 indicates a portion of the spindle support which is intended to connect with a portion of the bit head, the vertical axis of which is designated by the line x—x.

The main part of the spindle shown at 2 is integral with its support. At 3 is shown the terminal section of the spindle having a stem 3a extending through a bore in the main section. These parts are welded together at 4. The terminal spindle section has a head or flange 5 at its free end, against which the annular reduced portion or flange 6 of the main section bears with its free end face. The outer annular face (i. e., that surface 7 which faces towards the spindle support) of the flange head of the terminal is of frusto-conical shape in that it is inclined to the axis of the spindle. The annular face 8 of this head or flange 5 is also frusto-conical, and the two faces 7 and 8 meet at an edge 9. The extreme terminal face 10 of the terminal spindle section lies in a plane at right angles to the axis of the spindle. The main section of the spindle is generally of frusto-conical form with the larger diameter end at the spindle support, and the bore within the base of the cutter is frusto-conical complementary to the frusto-conical portion of the main spindle section.

Comparatively long frusto-conical bearing rollers 11 engage at their larger diameter and faces a shoulder 12 on the main section of the spindle. This shoulder is undercut so that only one-half of the end face of the bearing roller engages the shoulder, while the other half of said end face is free from contact with the shoulder. The small end faces of the frusto-conical bearing rollers engage the shoulder 13 near the smaller diameter or free end of the main section of the spindle. The row of frusto-conical rollers thus lies in the groove in the main section of the spindle formed between the shoulders 12, 13; and the bottom wall 14 of this groove is frusto-conical, i. e., it is at an inclination to the axis of the spindle. Locking rollers 15 for rotatively locking the roller cutter on the spindle are of comparatively short length. They lie between opposing surfaces of the main and terminal sections of the spindle, that is to say, the surface 7 of the flange or head 5 of the terminal section and the annular face 16 at the inner end of the main section of the spindle. The smaller ends of these frusto-conical locking rollers are towards the free end of the spindle. These locking rollers are arranged in a row and they roll on the surface of the reduced end of the main section of the spindle, and upon a frusto-conical raceway 17 in the cutter, and a shoulder 18 on the roller cutter bears on a portion of the larger diameter face of the conical locking rollers.

The raceway surface 17 of the cutter extends from the edge 9 of the flange or head of the terminal section of the spindle, and these locking rollers are completely shielded by the head of the terminal section of the spindle from compresssive force of the cutter endwise outward towards the spindle support.

The elongated frusto-conical rollers are likewise shielded from compressive force of the cutter in the direction of their axes both inwardly towards the vertical axis of the drill and outwardly of the assembly, towards the spindle support as they do not extend across the joint between the spindle and cutter.

The frusto-conical bearing rollers 11 take the heavy radial loads and they take on their peripheries end thrust of the cutter outward towards the spindle support. Friction bearing surfaces are provided at 19 and 20 between the cutter and the main spindle cylinder adjacent the ends of the frusto-conical bearing rollers 11.

The construction and relation of the parts enable the employment of a cutter member whose wall is comparatively thick throughout. Contributing to this effect is the use of the locking rollers near the apex end of the cutter, which avoids the use of a flange at the base of the cutter in part defining a runway within the wall of the cutter, and contributing to this effect also is the use of the long frusto-conical bearing rollers located wholly within the limits of the main section of the spindle. It is to be noted also that three friction bearing surfaces are available between the cutter and spindle, one at each end of the frusto-conical bearing rollers, and one at the free end of the terminal spindle section.

It will be seen, therefore, that the heavy duty rollers i. e., the comparatively long frusto-conical rollers, are located between the heavy base portions of the cutter and spindle comparatively close to the spindle support, while the rolling members which perform the lighter duty of retaining the cutter rotatively on the spindle are located nearer to the smaller diameter portions of the cutter and spindle.

These locking rollers sustain some radial load and some of the end thrust of the cutter imposed upon their peripheries.

I claim:

1. A spindle for a roller cutter of an earth boring drill comprising a main section of general frusto-conical form with a comparatively wide annular groove therein near its base end, to receive frusto-conical bearing rollers, and having its free or inner end reduced to provide an annular raceway for roller locking means, and a terminal section having a shank fitting in a bore of the main section and a head or flange having an outer annular surface to fit against the main section and provide a bearing for said locking rollers, said bearing surface being of frusto-conical form, said head or flange having a peripheral frusto-conical surface at its free end intersecting the plane of the first mentioned frusto-conical bearing surface, substantially as described.

2. In combination, a spindle support, a spindle projecting therefrom towards the vertical axis of the drill and tapered substantially from its supported end to its free end, a frusto-conical cutter on the spindle, comparatively long frusto-conical rollers between complementary frusto-conical surfaces of the spindle and cutter near their base ends, taking radial loads and taking on their peripheries end thrust of the cutter outwardly towards the spindle support and rolling locking means for retaining the roller cutter rotatively on the spindle, said rolling locking means being located at a zone between the frusto-conical bearing rollers and the free end of the spindle the taper of the spindle at its free end portion being steeper with respect to the spindle axis than that near its base portion, and the roller cutter being correspondingly formed.

3. A roller cutter spindle and roller bearing assembly for earth boring drills comprising a spindle support, a spindle inclining downwardly and inwardly from the support towards the vertical axis of the drill, a frusto-conical roller cutter enclosing the free end of the spindle, frusto-conical roller bearings arranged in a row about the base portion of the spindle taking radial loads, and taking upon their peripheries end thrust of the cutter outwardly towards the spindle support, said spindle and roller cutter having complementary frusto-conical raceways for said frusto-conical roller bearings, and having also shoulders to be engaged by locking means, and means to rotatively lock the roller cutter on the spindle, consisting of short rollers bearing with their end faces respectively upon said shoulders of the spindle and cutter, said locking rollers being located at a zone intermediate the position of the frusto-conical bearing rollers and the free end of the spindle, said spindle being generally of frusto-conical form and having a groove in which the frusto-conical roller bearings are wholly located and are thereby shielded from compressive end thrust of the cutter against their end faces in the direction of the axes of said roller bearings.

4. A roller cutter spindle and roller bearing assembly for earth boring drills comprising a spindle support, a spindle inclining downwardly and inwardly from the support towards the vertical axis of the drill, a frusto-conical roller cutter enclosing the free end of the spindle, frusto-conical roller bearings arranged in a row about the base portion of the spindle taking radial loads, and taking upon their peripheries end thrust of the cutter outwardly towards the spindle support, said spindle and roller cutter having complementary frusto-conical raceways for said frusto-conical roller bearings, and having also shoulders to be engaged by locking means, and means to rotatively lock the roller cutter on the spindle, consisting of short rollers bearing with their end faces respectively upon said shoulders of the spindle and cutter, said locking rollers being located at a zone intermediate the position of the frusto-conical bearing rollers and the free end of the spindle, said spindle being generally of frusto-conical form and having a groove in which the frusto-conical roller bearings are shielded from compressive end thrust of the cutter against their end faces in the direction of the axes of said roller bearings, said locking rollers being shielded throughout their inner end faces by the said shoulder on the spindle from end thrust of the cutter in the direction of their axes, substantially as described.

5. In an earth boring roller cutter, spindle and bearing organization, a spindle having a support at its outer end and composed of a main section integral with the support and a terminal section at its free end, the main section of said spindle being uniformly tapered towards its free end and having a roller bearing raceway, the bottom of which tapers towards the spindle free end, frusto-conical rollers in said spindle raceway and having their outer surfaces coincident with the surface of the uniformly tapered main spindle section, said main section of the spindle having a reduced diameter end portion spaced apart from said raceway leaving intermediate said raceway and said reduced diameter portion an intact body portion of said main spindle section whose surface conforms to the uniform taper of said section, a removable terminal spindle section having a shank seated within the main section and having a portion bearing on the end of the reduced diameter terminal portion of the main spindle section, said removable spindle section having a face tapered outwardly and also a face tapered inwardly, frusto-conical locking rollers located between the terminal and main spindle sections, bearing with their inner faces upon the outwardly tapered face of the removable spindle section, and rolling upon the reduced diameter terminal portion of the main spindle section, and a frusto-conical roller cutter having a bore uniformly tapered from its base to the point where said main section is reduced in diameter, said uniformly tapered bore bearing on the peripheries only of the frusto-conical bearing rollers and also on the periphery of the main spindle section at the intact body portion thereof, said roller cutter having an annular shoulder extending outwardly from its bore and bearing on the outer faces of the locking rollers, and having a terminal bore bearing upon the peripheries of the locking rollers and upon the terminal inwardly tapered surface of the removable spindle section.

6. A roller cutter for an earth boring drill of frusto-conical form having a bore made up of the following formations, viz., a frusto-conical portion within the base of the cutter tapering uniformly towards the apex end thereof, an annular outwardly extending shoulder at the smaller diameter end of said frusto-conical bore portion having its face directed towards the apex end of the cutter, and in a plane intersecting the axis of the cutter, a comparatively narrow annular bearing surface extending from the outer end of said shoulder towards the apex of the cutter to receive locking rollers, and a frusto conical bearing surface within the apex portion of the cutter, substantially as described.

CLARENCE E. REED.